Oct. 11, 1927.
W. A. HASTINGS
HANDLE
Filed Nov. 6, 1926
1,645,381
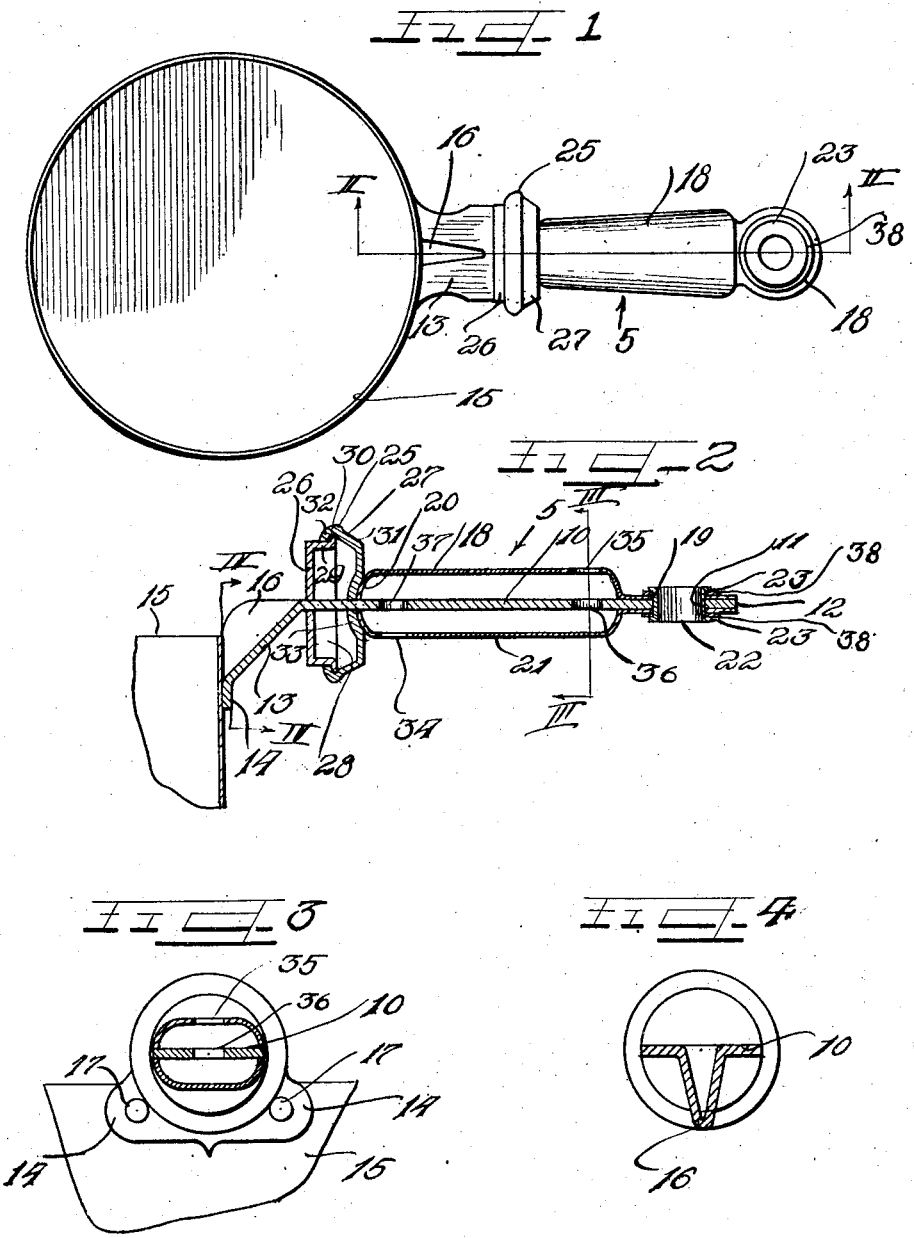
Inventor
William A. Hastings Patented Oct. 11, 1927.

1,645,381

UNITED STATES PATENT OFFICE.

WILLIAM A. HASTINGS, OF LA GRANGE, ILLINOIS, ASSIGNOR TO ALUMINUM PRODUCTS COMPANY, OF LA GRANGE, ILLINOIS, A CORPORATION OF ILLINOIS.

HANDLE.

Application filed November 6, 1926. Serial No. 146,594.

The invention relates to handles for cooking utensils and other implements to be heated.

One of the objects is to provide a rigid, strong handle which presents rounding contour comfortable to the user, which is inexpensive to manufacture, and which is so ventilated as to produce air draughts therethrough to disperse some of the heat which might otherwise accumulate and make its use unpleasant.

Another object is to provide a hand guard and shield between the hand grasping member and the utensil which shields the hand from heat and which prevents the hand from contacting the heated parts nearer the utensil.

Other objects, advantages and benefits will readily appear to persons skilled in the art from a consideration of the following description and the drawings forming a part hereof wherein:

Figure 1 is a plan view of the handle as it appears when attached to a stew pan.

Figure 2 is a section taken on line II—II of Figure 1.

Figure 3 is a section taken on line III—III of Figure 2.

Figure 4 is a section taken on line IV—IV of Figure 2.

In all of the views the same reference characters indicate similar parts.

The handle 5 is a composite structure made of sheet metal parts that may conveniently and cheaply be punched and formed for quick assembly.

An intermediate plate or member 10, is made of relatively thick strong material, such for example, as sheet steel or the like.

The member 10 is a narrow elongated plate having a perforation 11 through its outer end 12. In the present example the inner end of the member 10 is bent at 13 to provide a flat part 14 for connection with a utensil or implement 15. A gusset or reinforcing angular rib 16 may be formed in the angular part 13 to give the handle greater strength. The flat down turned part 14 for attachment to the utensil 15 should be welded or riveted thereto. The latter means of connection is shown in Figure 3 in which the rivets 17 are shown for the purpose.

A transversely curved plate or member 18 overlies the member 10 and at its outer end it is perforated with a hole 19 to register with the hole 11 in part 10. Its inner end is curved as at 20, so that its end edge is in contact with the upper surface of the member 10. An underlying plate 21 is a substantial duplicate of the plate or member 18. The outer end of member 21 is also perforated and in register with the holes 11 and 19.

A hollow rivet 22 extends through the three aligning holes and is held by its overturned ends to form flanges 23—23.

The members 10—18 and 21 are suitably perforated, as at 34, 35, 36 and 37 and elsewhere if desired to provide passages for circulation of air through the handle and between the handle members to prevent accumulation of heat therein. A mica washer 38 may be placed between adjacent metal parts to serve as a heat insulator.

A hand guard 25 comprises two disk-like members 26 and 27. These disks are spaced apart to provide a casing with an air chamber 28 therein. The disk 26 has a lateral flange 29 and its perimeter has a narrow radial flange 30. The disk 27 has a lateral flange 31 and a flange 32 which overlies the radial flange 30 to hold the parts together. The disk 27 has a central indentation 33 to receive and to hold the curved ends 20 of the members 18 and 21. The disks 26 and 27 surround the intermediate member 10 and are made fast thereto in any suitable manner.

The casing 25 serves as a guard for the hand to prevent it from slipping too near to the heated utensil and as a heat shield to protect the hand from the intense radiated heat.

The perforation in the outer end of the handle while contributing as a member for fastening the three members of the handle together may be utilized as a means for hanging the utensil on a peg or pin, when not in use.

I am aware that many changes may be made and numerous details of construction may be varied through a wide range without departing from the principles of this invention and I therefore do not purpose limiting the patent granted hereon otherwise than necessitated by the prior art.

I claim as my invention:

A ventilated handle for cooking utensils including an elongated flat intermediate member terminating in a reinforced angular inner end and a perforated outer end; a pair of transversely curved plates fixed to and spaced from said intermediate member, one overlying and one underlying said intermediate member, each curved plate having a perforation registering with the perforation in the intermediate member; a hollow rivet extending through all said perforations and having terminal flanges to hold said members together and a disk-like hand guard surrounding said intermediate member and fixed thereto and engaging said curved members to hold the latter fixed in place.

In testimony whereof I have hereunto subscribed my name.

WILLIAM A. HASTINGS.